United States Patent
Rohde

(10) Patent No.: US 8,625,845 B2
(45) Date of Patent: Jan. 7, 2014

(54) OVERLAYING VIRTUAL CONTENT ONTO VIDEO STREAM OF PEOPLE WITHIN VENUE BASED ON ANALYSIS OF THE PEOPLE WITHIN THE VIDEO STREAM

(75) Inventor: Mitchell M. Rohde, Saline, MI (US)

(73) Assignee: Quantum Signal, LLC, Ann Arbor, MI (US)

( * ) Notice: Subject to any disclaimer, the term of this patent is extended or adjusted under 35 U.S.C. 154(b) by 736 days.

(21) Appl. No.: 12/706,206

(22) Filed: Feb. 16, 2010

(65) Prior Publication Data

US 2010/0142928 A1 Jun. 10, 2010

Related U.S. Application Data

(63) Continuation-in-part of application No. 11/460,981, filed on Jul. 29, 2006, now abandoned.

(60) Provisional application No. 60/705,746, filed on Aug. 6, 2005.

(51) Int. Cl.
*G06K 9/00* (2006.01)

(52) U.S. Cl.
USPC .......................................................... 382/103

(58) Field of Classification Search
USPC .......................................................... 382/103
See application file for complete search history.

(56) References Cited

U.S. PATENT DOCUMENTS

| | | | |
|---|---|---|---|
| 5,959,717 A * | 9/1999 | Chaum | 352/40 |
| 6,400,374 B2 * | 6/2002 | Lanier | 345/630 |
| 6,508,553 B2 * | 1/2003 | Gao et al. | 351/227 |
| 6,634,754 B2 * | 10/2003 | Fukuma et al. | 351/227 |
| 7,027,101 B1 * | 4/2006 | Sloo et al. | 348/564 |
| 7,259,747 B2 | 8/2007 | Bell | |
| 7,348,963 B2 | 3/2008 | Bell | |
| 7,528,890 B2 | 5/2009 | Staker et al. | |
| 7,536,032 B2 | 5/2009 | Bell | |
| 7,646,434 B2 | 1/2010 | Staker et al. | |
| 7,649,571 B2 | 1/2010 | Staker et al. | |
| 7,710,391 B2 | 5/2010 | Bell et al. | |
| 7,809,167 B2 | 10/2010 | Bell | |
| 7,834,846 B1 | 11/2010 | Bell | |
| RE42,205 E * | 3/2011 | Jung et al. | 382/103 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,081,822 B1 | 12/2011 | Bell | |
| 8,098,277 B1 | 1/2012 | Bell | |
| 8,135,724 B2 | 3/2012 | Smyers | |
| 8,159,682 B2 | 4/2012 | Bell | |
| 8,199,108 B2 | 6/2012 | Bell | |
| 8,230,367 B2 | 7/2012 | Bell et al. | |
| 8,259,163 B2 | 9/2012 | Bell | |
| 2002/0073417 A1 * | 6/2002 | Kondo et al. | 725/10 |
| 2002/0186221 A1 | 12/2002 | Bell | |
| 2004/0194128 A1 * | 9/2004 | McIntyre et al. | 725/32 |

(Continued)

*Primary Examiner* — Tom Y Lu
(74) *Attorney, Agent, or Firm* — Michael Dryja

(57) ABSTRACT

A video stream of people within a venue like a movie theater is received. The people within the video stream are analyzed. Based on analysis of the people within the video stream, virtual content is overlaid onto the video stream. The video stream, with the virtual content overlaid thereon, is then displayed onto a screen within the venue. As such, the virtual content and one or more of the people within the venue can appear to be interacting with one another as if the virtual content were real and present within the venue.

28 Claims, 9 Drawing Sheets

(56) References Cited

U.S. PATENT DOCUMENTS

| | | |
|---|---|---|
| 2004/0218100 A1 | 11/2004 | Staker et al. |
| 2005/0011964 A1 | 1/2005 | Greenlee |
| 2006/0136979 A1 | 6/2006 | Staker et al. |
| 2009/0040385 A1 | 2/2009 | Staker et al. |
| 2009/0041422 A1 | 2/2009 | Staker et al. |
| 2009/0237565 A1 | 9/2009 | Staker et al. |
| 2009/0237566 A1 | 9/2009 | Staker et al. |
| 2010/0027961 A1 | 2/2010 | Gentile et al. |
| 2010/0031149 A1 | 2/2010 | Gentile et al. |
| 2010/0035682 A1 | 2/2010 | Gentile et al. |
| 2010/0039500 A1 | 2/2010 | Bell et al. |
| 2010/0060722 A1 | 3/2010 | Bell |
| 2010/0121866 A1 | 5/2010 | Bell et al. |

* cited by examiner

OVERLAYING VIRTUAL CONTENT ONTO VIDEO STREAM OF PEOPLE WITHIN VENUE BASED ON ANALYSIS OF THE PEOPLE WITHIN THE VIDEO STREAM

RELATED APPLICATIONS

The present patent application is a continuation-in-part of the previously filed patent application entitled "Interactive, video-based content for theaters," filed on Jul. 29, 2006, and assigned Ser. No. 11/460,981, and which claims the benefit of the previously filed provisional patent application having the same title, filed on Aug. 6, 2005, and assigned Ser. No. 60/705,746. The content of these two patent applications is hereby incorporated into the present patent application by reference.

BACKGROUND

Patrons of a movie theater typically arrive some time before the show time of a movie to which they bought tickets. During this time, they may buy concessions, and then settle into their seats in the movie theater, waiting for the movie to start. Movie theaters have tried to engage their customers during this time, by showing advertisements on the screen, and so on. However, many customers tune out these advertisements, reducing their effectiveness. Furthermore, younger patrons in particular can become bored, and start doing things that the movie theatres would prefer they not, such as causing problems with other patrons, raising their voices too much, and so on.

SUMMARY

The present invention overlays virtual content onto a video stream of the people within a movie theater, based on an analysis of the people within the video stream. In one embodiment, a video stream of the people within a movie theater is received. A processor of a computing device analyzes the people within the video stream, and overlays virtual content onto the video stream based on this analysis. The video stream, with the virtual content overlaid thereon, is displayed on a screen within the movie theater. For instance, the virtual content and one or more of the people may appear to be interacting with one another, as if the virtual content were real and present within the movie theater.

The virtual content may include advertisements, such as logos of businesses. Because of the interactive nature of the virtual content, the patrons within the movie theater are less likely to tune out the virtual content, increasing the effectiveness of the advertisements. The virtual content may also engage patrons that would otherwise become bored, reducing the likelihood that the patrons start partaking in conduct that the movie theatres would prefer they not do. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
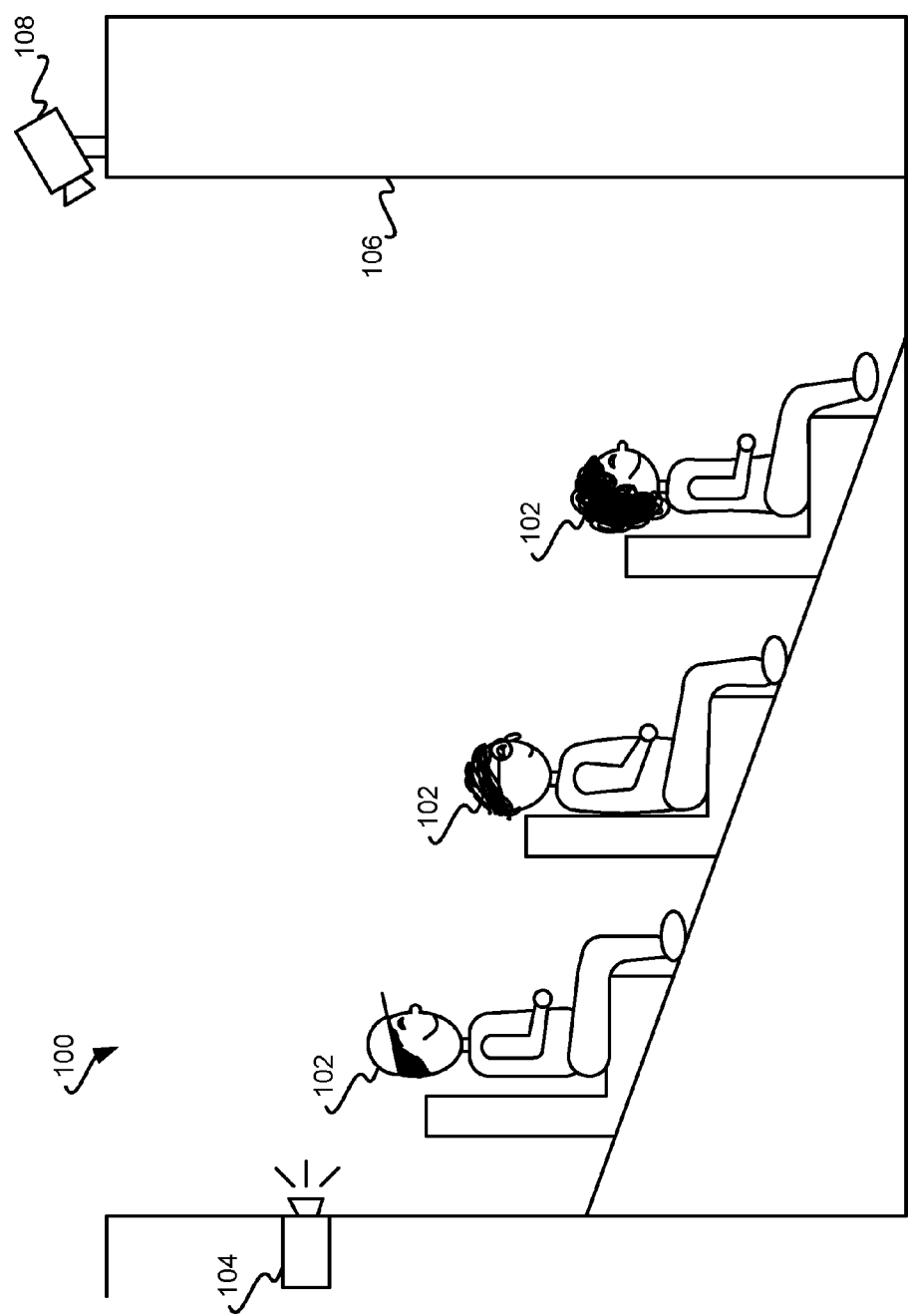
FIG. 1 is a diagram of a movie theater, according to an embodiment of the invention.

FIG. 1 shows a representative movie theater 100, according to an embodiment of the invention. The movie theater 100 is more generally a venue. A number of people 102 are seated within the movie theater 100 towards a screen 106. A projector 104 projects a video stream onto the screen 106, for viewing by the people 102. A video camera 108 records or generates a video stream of the people 102.

In general, the video stream of the people 102 recorded or generated by the video camera 108 is analyzed, and virtual content is overlaid onto the video stream based on this analysis. The projector 104 then displays the video stream of the people 102, within which the virtual content has been overlaid, onto the screen 106. This process occurs in real time or in near-real time.

There may be more than one video camera 108. For instance, more than one video camera 108 may be used to provide for better coverage of the people 102 within the theater 100, as well as different types of coverage of the people 102 within the theater 100. As examples of the latter, stereo and time-of-flight video cameras may be employed.

Different examples of such virtual content, according to different embodiments of the invention, are now described. The present invention, however, is not limited to these examples. Other embodiments of the invention may employ other types of virtual content, in addition to and/or in lieu of those described herein. In some embodiments, the virtual content is overlaid so that it appears one or more of the people within the movie theater are interacting with the virtual content as if the virtual content were real and present within the theater.

Figure 2:
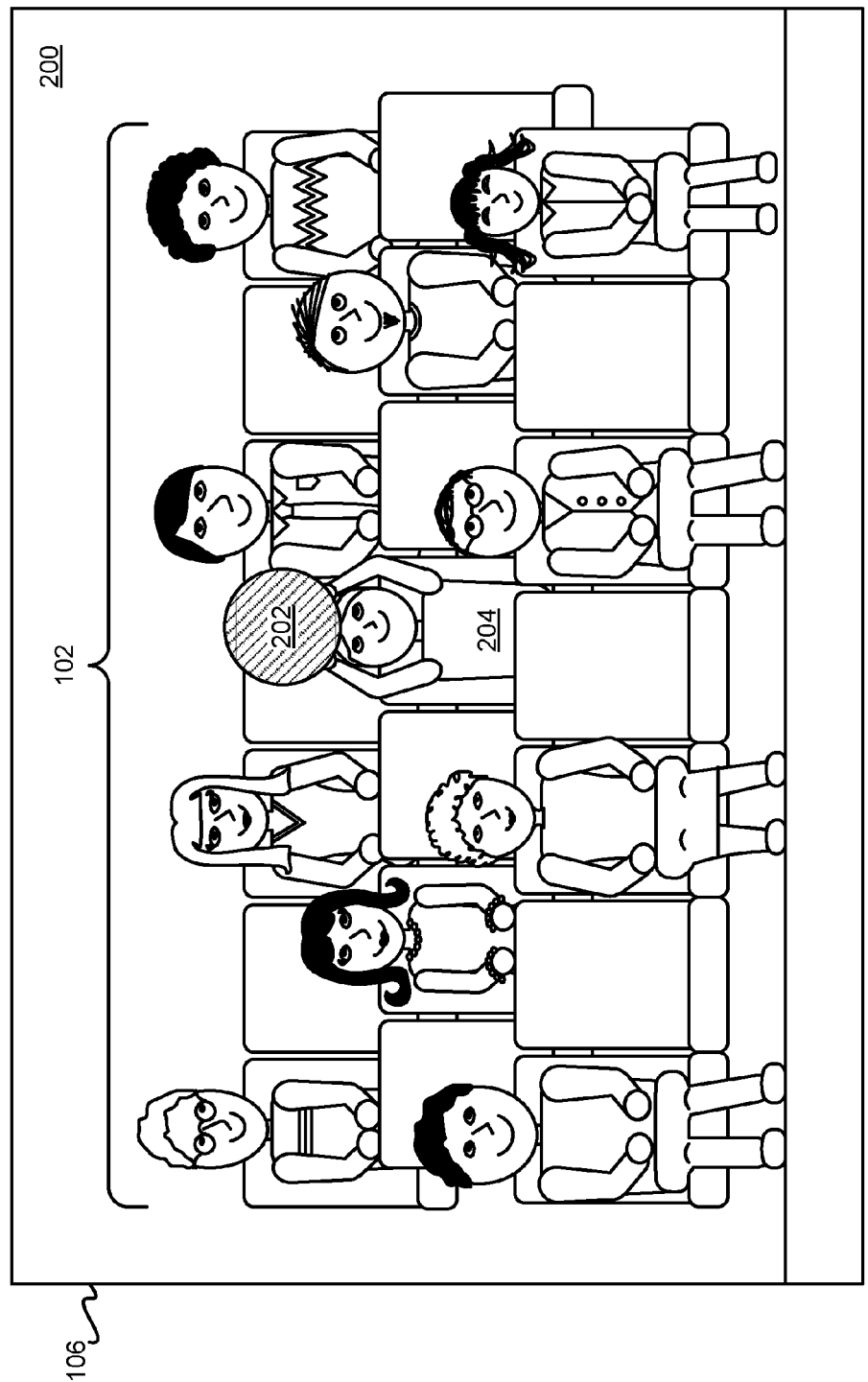
FIGS. 2-6 are diagrams of examples of virtual content that may be overlaid onto a video stream of people within a movie theater, according to an embodiment of the invention.

FIG. 2 shows an example of virtual content overlaid onto a video stream 200 of the people 102 in a movie theater, according to an embodiment of the invention. The video stream 200 is displayed on the screen 106. The video stream 200 is of the people 102 seated in the movie theater.

A virtual object 202 has been overlaid onto the video stream 200. That is, the virtual object 202 does not actually exist in the movie theater, but rather is overlaid onto the video stream 200 in FIG. 2. The virtual object 202 is a moving object, and has motion to approximate or mirror that of a real physical object, like an inflated beach ball.

When the virtual object 202 is first overlaid onto the video stream 200, it may movie as if it had dropped from the ceiling of the movie theater. The video stream 200 is analyzed to detect which person is close to the virtual object 202, and to detect motion of this person. The motion of the virtual object 202 as overlaid onto the video stream 200 is then changed as if the virtual object 202 were real, and this person were interacting with the virtual object 202.

For example, as specifically depicted in FIG. 2, the person 204 is raising his or her hands to hit the virtual object 202. As such, the motion of the virtual object 202 as overlaid onto the video stream 200 will change so that it appears the object 202 has bounced off or has been hit by the person 204. In this respect, the virtual object 202 and the person 204 appear to be interacting with one another, as if the virtual object 202 were real and present within the movie theater.

The virtual object 202 may have a logo of a business, or an advertisement, on it. Therefore, while the people 102 are having fun playing with a virtual beach ball, for instance (i.e., interacting with the virtual content), they are more likely to continue watching the video stream 200 displayed on the screen 106, and thus more likely to view the logo or the advertisement, instead of not concentrating on the screen 106. The invention thus advantageously entertains the people 102 while they are waiting for a movie to start, while potentially providing increased advertising revenue to the movie theater.

Figure 3:
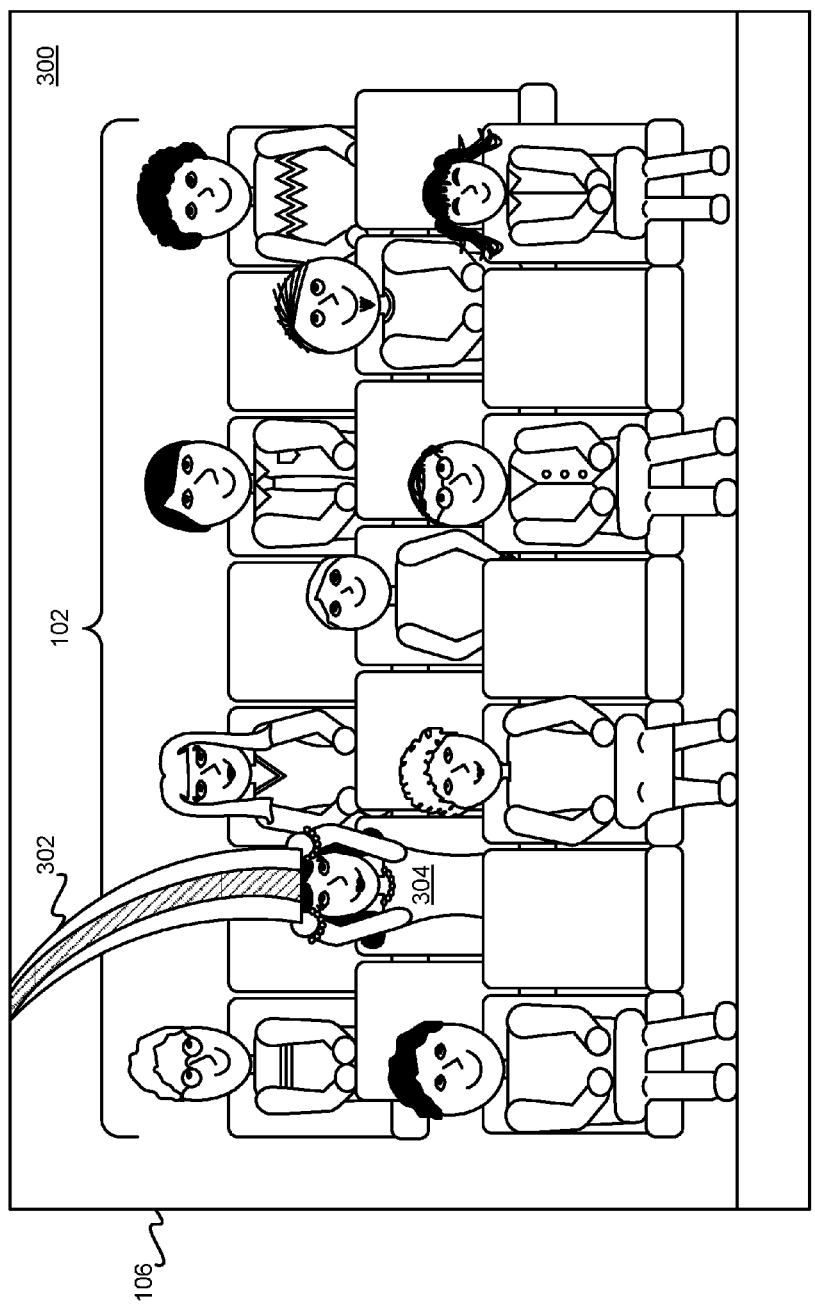

FIG. 3 shows an example of virtual content overlaid onto a video stream 300 of the people 102 in a movie theater, according to a second embodiment of the invention. The video stream 300 is displayed on the screen 106. The video stream 300 is of the people 102 seated in the movie theater.

A virtual object 302 has been overlaid onto the video stream 300. That is, the virtual object 302 does not actually exist in the movie theater, but rather is overlaid onto the video stream 300 in FIG. 3. The virtual object 302 is a ribbon or a rainbow, that starts from the top of the video stream 300 and lengthens and extends downward. The video stream 300 is analyzed to detect which person is close to the virtual object 302, and to detect motion of this person to see if he or she is trying to catch the object 302. If this person does not appear to be trying to catch the virtual object 302, then the object 302 continues to length and extend downwards towards the bottom of the video stream 300.

For example, as specifically depicted in FIG. 3, the person 304 is raising his or her hands so that it appears the person 304 has caught the virtual object 302. Once the person 304 has caught the virtual object 302, the virtual object 302 may disappear, and words like "good job" or "nice catch" virtually displayed on the video stream 300 near the person 304. In this respect, the virtual object 302 and the person 304 appear to be interacting with one another, as if the virtual object 302 were real and present within the movie theater.

The virtual object 302 may also have a logo of a business, or an advertisement, on it. Therefore, while the people 102 are having fun catching virtual ribbons or rainbows, for instance (i.e., interacting with the virtual content), they are more likely to continue watching the video stream 300 displayed on the screen 106, and thus more likely to view the logo or the advertisement, instead of not concentrating on the screen. The invention thus advantageously entertains the people 102 while they are waiting for a movie to start, while potentially providing increased advertising revenue to the movie theater.

The embodiments of FIGS. 2 and 3, among other embodiments of the invention, are examples of games. In these games, the people within the video stream are analyzed, and virtual content overlaid onto the video stream, to result in one or more of the people playing games in relation to the virtual content. In FIG. 2, the game is to hit a virtual beach ball, whereas in FIG. 3, the game is to catch a virtual ribbon or rainbow.

Figure 4:
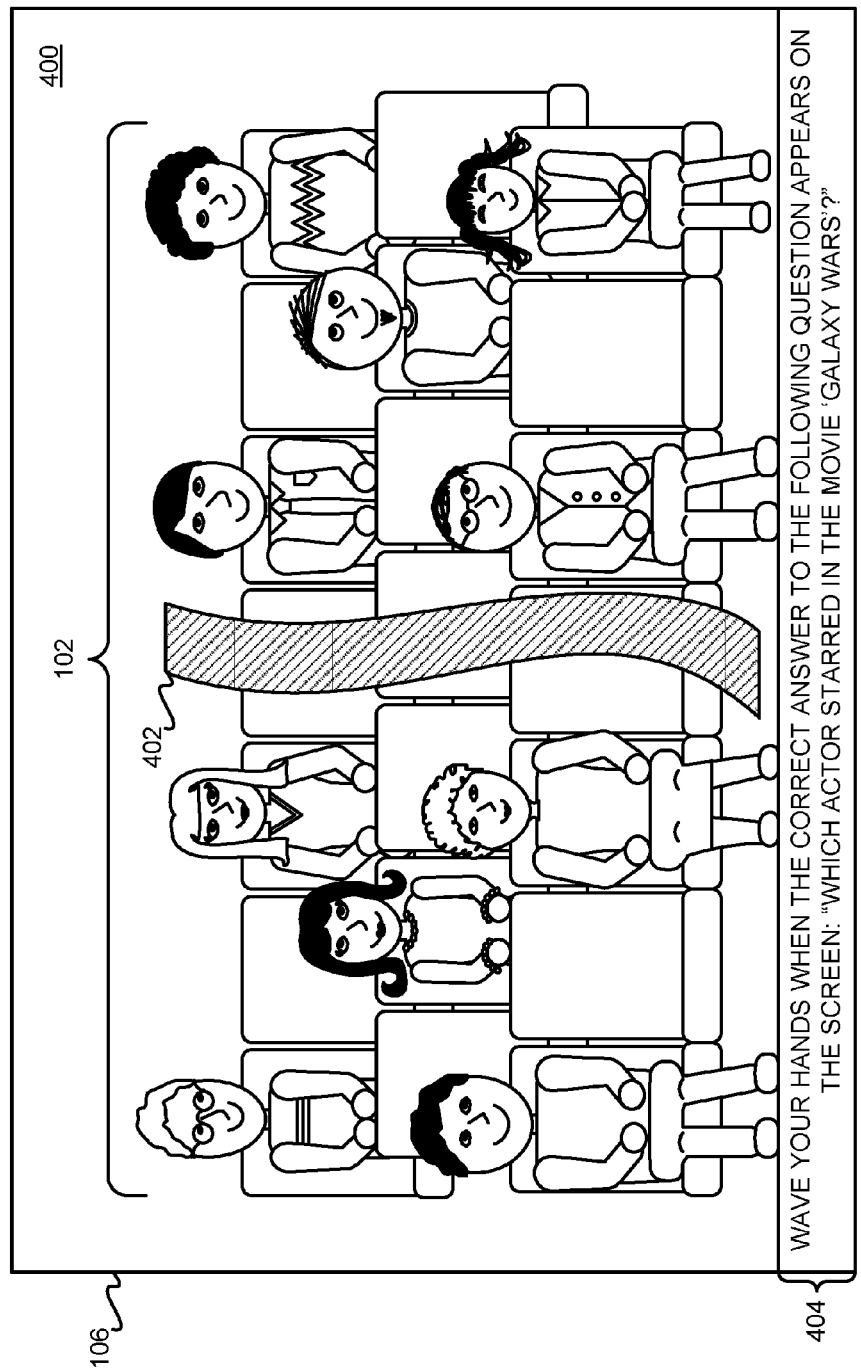

FIG. 4 shows an example of virtual content overlaid onto a video stream 400 of the people 102 in a movie theater, according to a third embodiment of the invention. The video stream 400 is displayed on the screen 106. The video stream 400 is of the people 102 seated in the movie theater.

A virtual object 402 has been overlaid onto the video stream 400. That is, the virtual object 402 does not actually exist in the movie theater, but rather is overlaid onto the video stream 400 in FIG. 4. The virtual object 402 is a divider, which logically divides the people 102 into two groups, a left group and a right group.

Virtual text 404 also is overlaid onto the video stream 400. The text 404 is a trivia question or a poll question. The people 102 are requested to wave their hands when the choice they want to select is virtually displayed on the video stream 400 projected onto the screen 106. After each choice is virtually displayed, the motion of the people within the video stream 400 is detected. In the example specifically depicted in FIG. 4, the people 102 have been logically divided into groups on either side of the virtual object 402, and are asked via the virtual text 404 to wave their hands when the correct answer to a movie trivia question is shown.

Once all the choices have been virtually displayed, in the case of a trivia question, it is determined which choice each group of the people 102 selected by virtue of their detected motion. The correct choice may then be virtually displayed, along with which group or groups of the people 102, if any, selected the correct choice. There may be a number of such trivia questions. As such, the groups of the people 102 are playing a trivia game against each other.

In the case of a poll, once all the choices have been virtually displayed, the top choice selected by each group of the people 102 by virtue of their detected motion is determined. The top choice for each group may then be virtually displayed. For instance, virtual text may be overlaid onto the video stream 400 that says "you guys prefer soft drink A, while you guys prefer soft drink B," and so on. There may be a number of such poll questions.

In the embodiment represented by FIG. 4, then, the people 102 within the video stream 400 are analyzed, and the virtual content 402 and 404 overlaid onto the video stream 400, to result in one or more of the people 102 answering a question. Analyzing the people 102 within the video stream 400 in this embodiment encompasses logically dividing the people 102 into a number of groups and detecting motion of the people 102 within each group. The virtual content is ultimately overlaid onto the video stream 400 based on the motions of the people 102 within the groups—such as which group answered which trivia questions correctly, and so on.

The embodiment of FIG. 4 may also be a game that is played by the people 102 before the movie starts. The virtual object 402, the virtual text 404, and/or other virtual objects may include logos of businesses, or advertisements. Therefore, while the people 102 are having fun answering poll or trivia questions, for instance (i.e., interacting with the virtual content), they are more likely to continue watching the video stream 400 displayed on the screen 106, and thus more likely to view the logos or the advertisements. The invention thus advantageously entertains the people 102 while they are waiting for a movie to start, while potentially providing increased advertising revenue to the theater.

Figure 5:
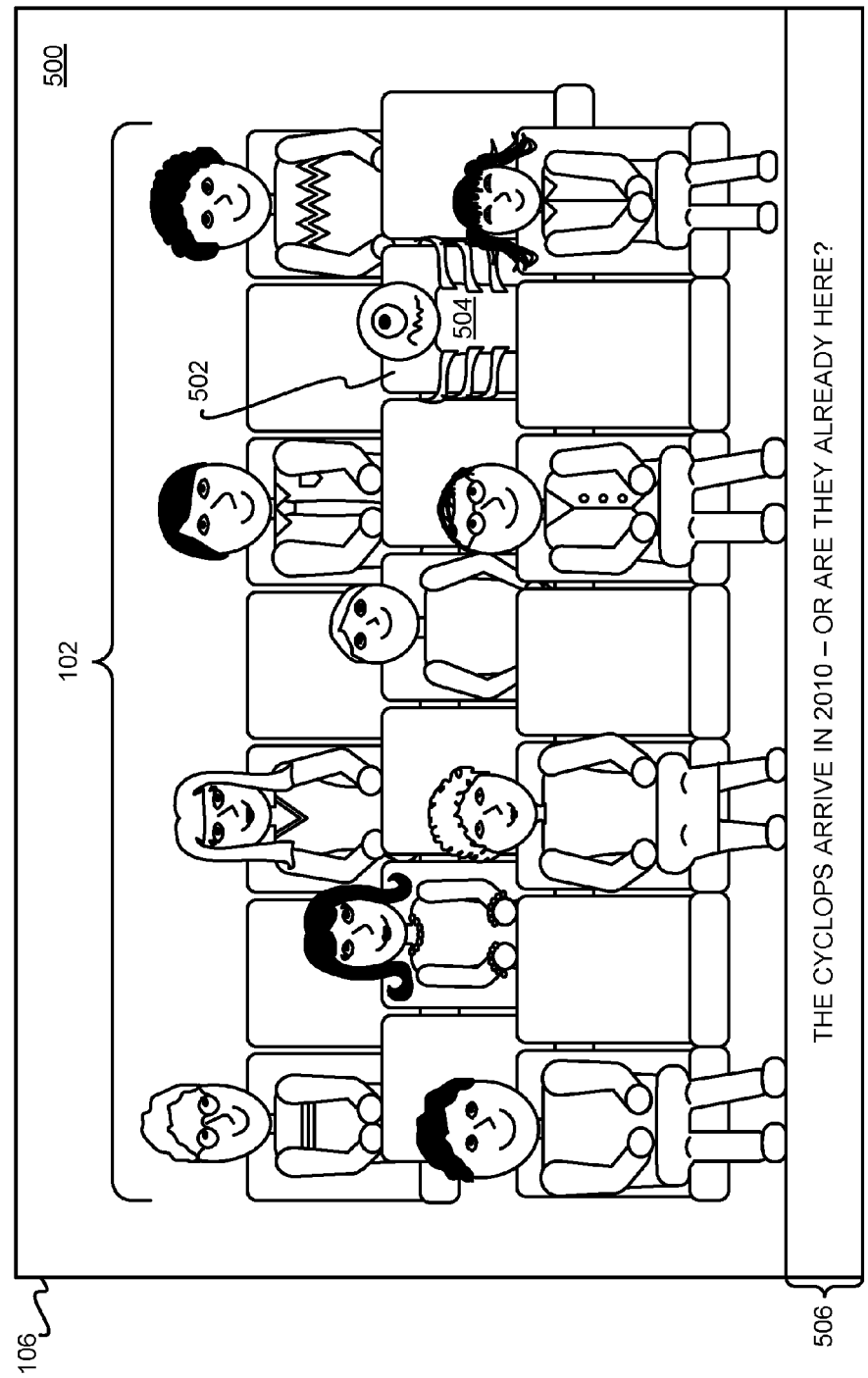

FIG. 5 shows an example of virtual content overlaid onto a video stream 500 of the people 102 in a movie theater, according to a fourth embodiment of the invention. The video stream 500 is displayed on the screen 106. The video stream 500 is of the people 102 seated in the movie theater.

A virtual character 504 has been overlaid onto an empty seat 502 in the video stream 500. The virtual character 504 does not actually exist and is not present in the movie theater, but rather is overlaid onto the video stream 500 in FIG. 5. In the example of FIG. 5, for instance, the virtual character 504 is a one-eye alien, such as a Cyclops. Thus, the virtual character 504 appears to be sitting in the empty seat 502 as if the character 504 were real and present within the movie theater. Analyzing the video stream 500 therefore includes locating an empty seat within the movie theater onto which to overlay the virtual character 504.

The virtual character 504 may be overlaid in conjunction with an advertisement. For example, the virtual text 506 may be a teaser advertisement associated with a movie to be released in the future. As a way to increase interest in the movie, the virtual character 504 is overlaid onto the video stream 500. The invention thus advantageously entertains the people 102 while they are waiting for a movie to start, and increasing interest in the advertisement with which the virtual text 506 is associated, by overlaying the virtual character 504 onto the video stream 500.

Figure 6:
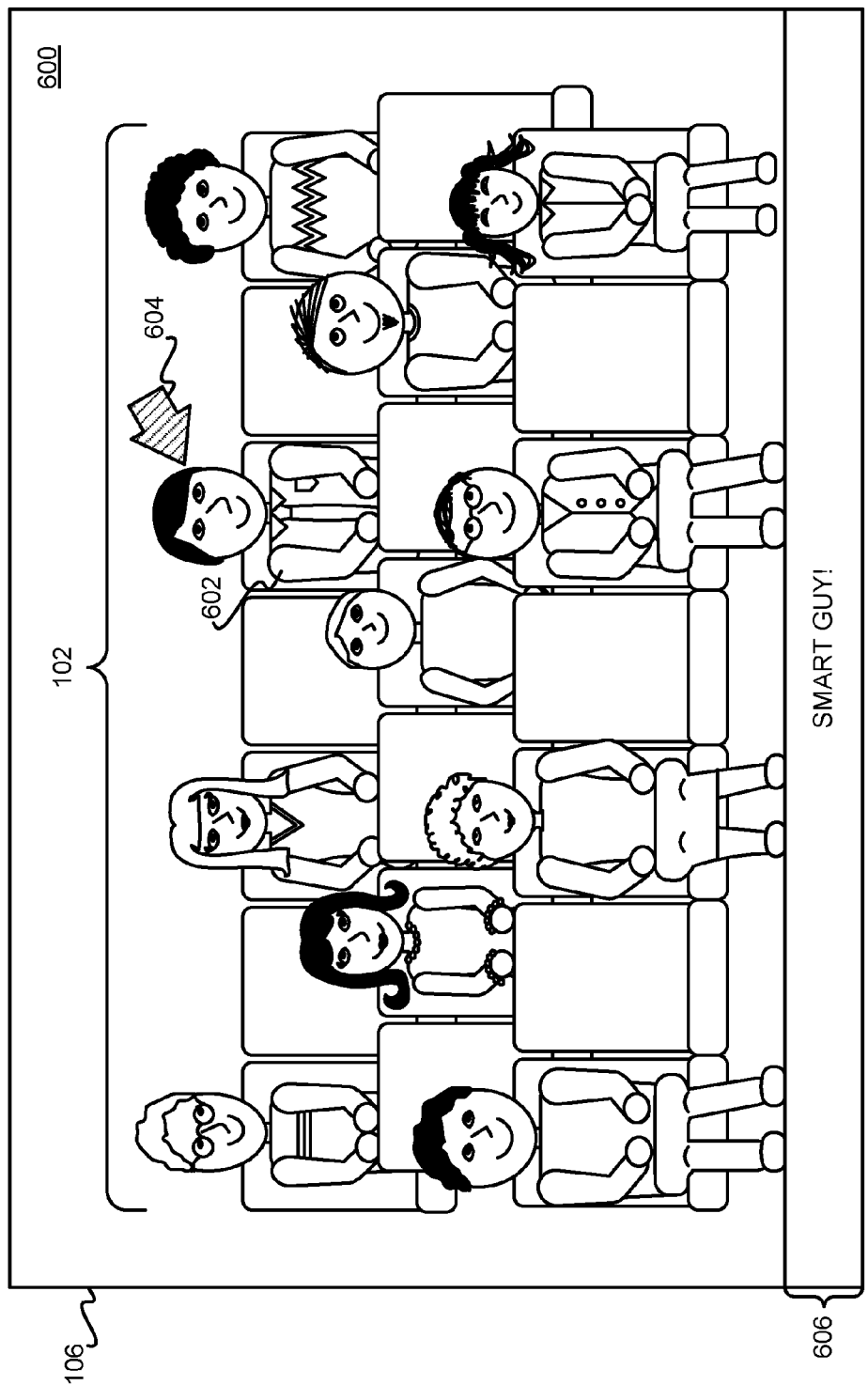

FIG. 6 shows an example of virtual content overlaid onto a video stream 600 of the people 102 in a movie theater, according to a fifth embodiment of the invention. The video stream 600 is displayed on the screen 106. The video stream 600 is of the people 102 seated in the movie theater.

A virtual object 604 has been overlaid onto the video stream 600. The virtual object 604 is a large arrow, which draws or calls attention to an actual and real given person 602 seated in the movie theater. Analyzing the video stream 600 therefore includes locating and selecting a person, such as randomly, within the movie theater. Virtual text 606 may also be overlaid onto the video stream 600, to describe the person selected, such as "smart guy!" in FIG. 6.

The invention thus advantageously entertains the people 102 while they are waiting for a movie to start. If there is additional text overlaid onto the video stream 600 associated with an advertisement or a logo of a business, the virtual object 604 and the virtual text 606 increases the likelihood that the people 102 will view and see the advertisement or logo. That is, the virtual object 604 is attending to draw interested of the people 102 to watch the screen 106 even before the movie starts.

Figure 7:
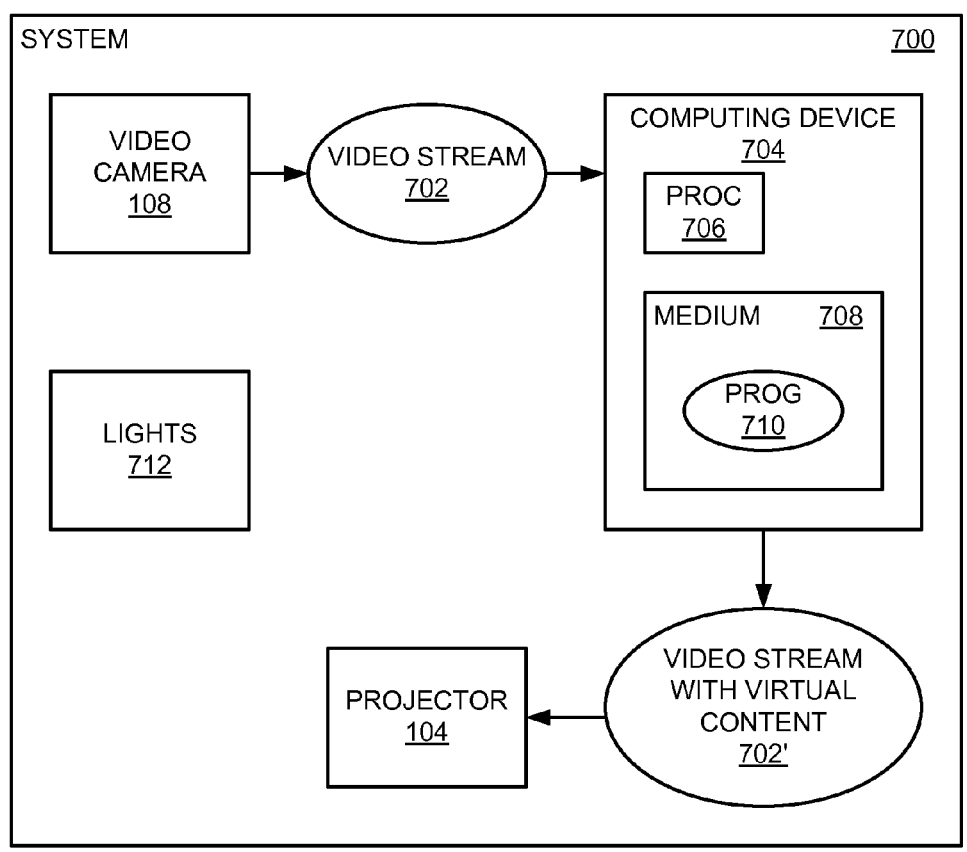
FIG. 7 is a diagram of a system, according to an embodiment of the invention.

FIG. 7 shows a system 700, according to an embodiment of the invention. The system 700 includes the video camera 108 and a computing device 704. The system 700 can also include one or more lights 712 to illuminate the people within the movie theater or other venue, and the projector 104. The video camera 108 generates a video stream 702 of the people within the movie theater or other venue.

The computing device 704 receives the video stream 702. The computing device 704 includes at least a processor 706 and a computer-readable storage medium 708, such as semiconductor memory and/or a hard disk drive. The computing device 704 can and typically does include other components. The computer-readable storage medium 708 stores a computer program 710 that is executed by the processor 706.

The computer program 710, when executed by the processor 706, analyzes the people within the video stream 702, and based on this analysis, overlays virtual content onto the video stream 702, to result in a video stream 702' that has virtual content overlaid thereon. Examples of such virtual content have been described above. The computer program 710 transmits the video stream 702' to the projector 104, which displays the video stream 702' on a screen within the movie theater or other venue.

Figure 8:
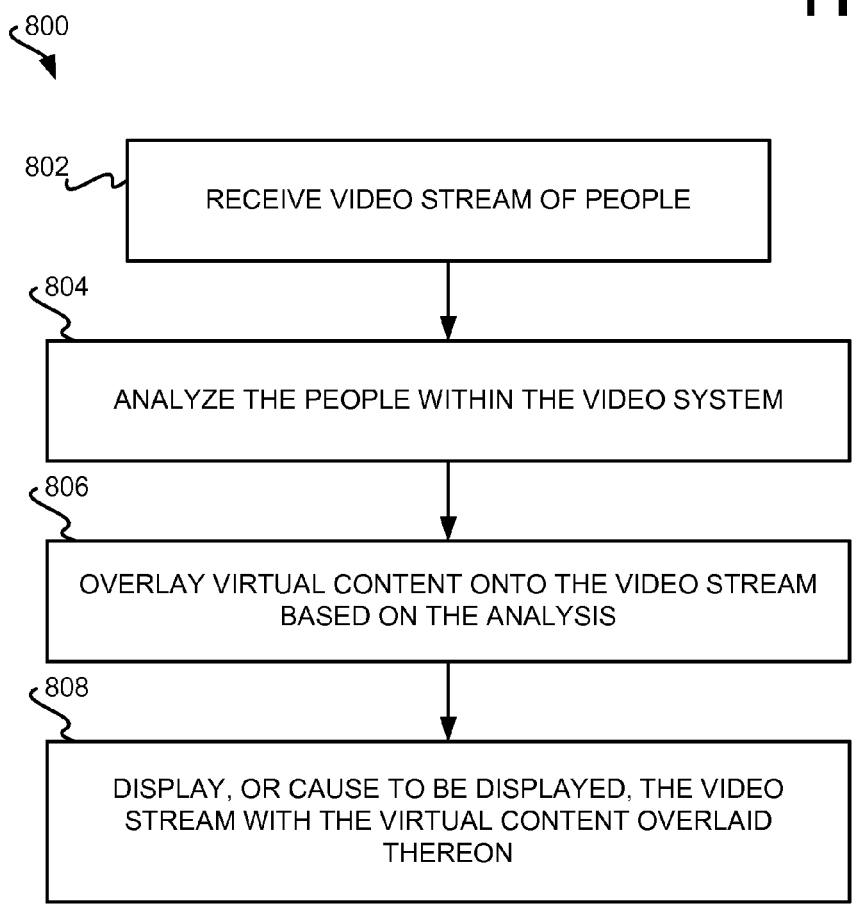
FIG. 8 is a flowchart of a method, according to an embodiment of the invention.

FIG. 8 shows a method 800, according to an embodiment of the invention. The method 800 can be performed as a result of execution of the computer program 710 stored on the computer-readable storage medium 708, by the processor 706. The video stream 702 of the people within a movie theater or other venue is received (802), as generated or recorded by the video camera 108.

The people within the video stream 702 are analyzed (804). Such analysis is performed by performing appropriate image processing and/or computer vision techniques, as can be appreciated by those of ordinary skill within the art. For instance, the locations of the people within the video stream 702 may be determined, the motion of the people within the stream 702 may be detected, the outlines or contours of the people within the stream 702 may be detected, and so on. As another example, the various body parts of the people, such as their faces, hands, and other parts, may be detected and tracked within the video stream 702.

Virtual content is then overlaid onto the video stream 702, based on the analysis of the people that has been performed (806). Static or animated virtual content, such as borders, graphics, and so on, may be synthesized based on the location, motion, and/or action of the people within the video stream 702, as can be appreciated by those of ordinary skill within the art. The video stream 702 may be used in whole or in part with the overlaid content. The resulting video stream 702', with the virtual content overlaid thereon, is then displayed, or caused to be displayed, on a screen within the movie theater or other venue (808).

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

Figure 9:
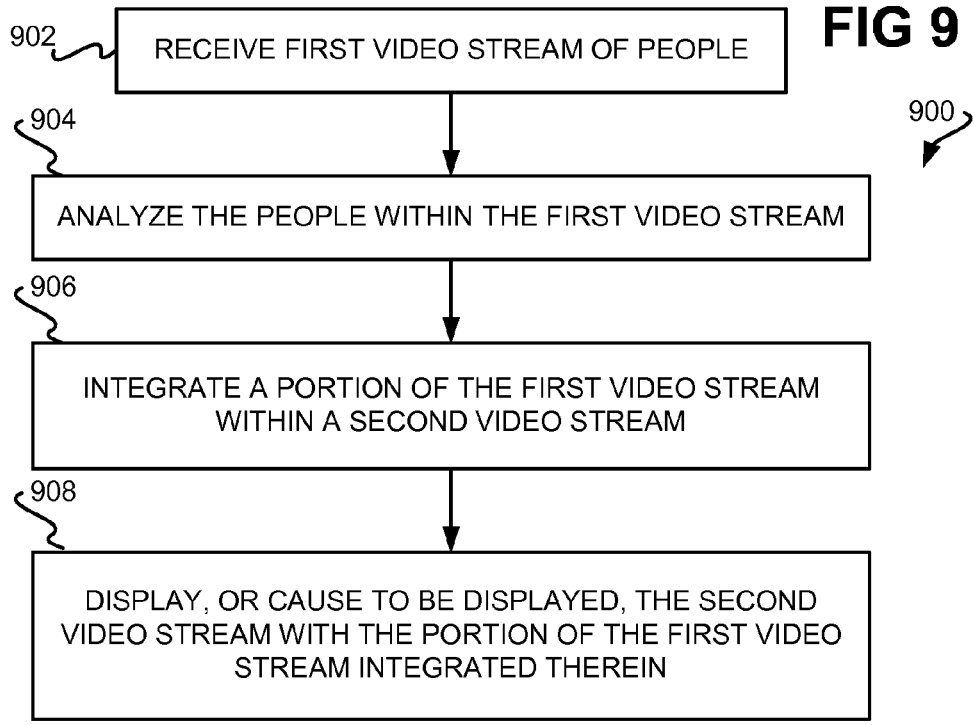
FIG. 9 is a flowchart of a method, according to another embodiment of the invention.

For example, FIG. 9 shows a method 900, according to another embodiment of the invention. Like the method 800 of FIG. 8, the method 900 can be performed as a result of execution of the computer program 710 stored on the computer-readable storage medium 708, by the processor 706. The (first) video stream 702 of the people within a movie theater or other venue is received (902), as generated or recorded by the video camera 108.

The people within the (first) video stream 702 are analyzed (904). Such analysis is performed by performing appropriate image processing and/or computer vision techniques, as can be appreciated by those of ordinary skill within the art. For instance, the locations of the people within the video stream 702 may be determined, the motion of the people within the stream 702 may be detected, the outlines or contours of the people within the stream 702 may be detected, and so on. As another example, the various body parts of the people, such as their faces, hands, and other parts, may be detected and tracked within the video stream 702.

A portion of the (first) video stream 702 is integrated within another (second) video stream, based on the analysis of the people that has been performed (906). For example, at least a part of one person within the (first) video stream 702 may be integrated within the second video stream. The second video stream, with the portion of the (first) video stream 702 integrated therein, is then displayed, or caused to be displayed, on a screen within the movie theater or other venue (908).

Figure 10:
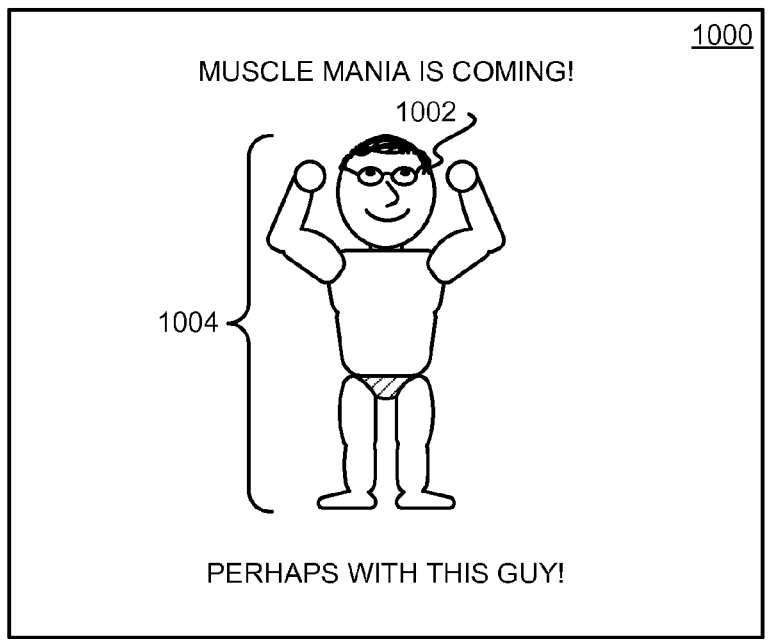
FIG. 10 is a diagram of an example of a first video stream integrated within a second video stream, according to an embodiment of the invention.

FIG. 10 shows an example of a (second) video stream 1000 with a portion of a (first) video stream 1002 integrated therein, according to an embodiment of the invention. The video stream 1000 with the portion of the video stream 1002 integrated therein is displayed on the screen 106. The portion of the video stream 1002 is the head of a person seated in the movie theater in which the screen 106 is located. By comparison, the video stream 1000 is a promotional trailer for a movie.

Therefore, the head of a person seated in the movie theater is transposed onto the body 1004 within the promotional trailer for a movie. The purpose is to increase the audience's attention of the promotional trailer, by substituting the head of the actor within the promotional trailer for the head of a person seated in the movie theater. This may be done to comedic effect, as well. In the example of FIG. 10, for instance, the body 1004 is that of a bodybuilder, whereas the audience member within the video stream 1002 having the head that is transposed onto the body 1004 may not be a bodybuilder at all.

In general, then, this example shows how in one embodiment, a portion of the video stream of the people within a venue may be integrated with another video stream, such as that of a promotional trailer for a movie. The portion of the video stream of the people within a venue may be a static image in one embodiment. As depicted in the example of FIG. 10, the head of a member of the audience in a movie theater is transposed onto the body of an actor within a promotional trailer for a movie.

This embodiment of course encompasses other examples as well. As just one example, the promotional trailer for a movie may involve the primary actors sitting in a room with a number of secondary actors, known as "extras," sitting in the background. Some members of the audience within the (first) video stream may be displayed within the (second) video stream of the promotional trailer on the screen within the movie theater, in addition to and/or in lieu of the extras originally present within the promotional trailer. Embodiments of the invention thus include this, and other exemplary scenarios, as well, as encompassed by the claims.

I claim:

1. A method comprising:
    receiving a video stream of a plurality of people within a venue;
    analyzing, by a processor of a computing device, the people within the video stream;
    overlaying, by the processor of the computing device, virtual content onto the video stream based on analysis of the people within the video stream; and,
    displaying the video stream, with the virtual content overlaid thereon, onto a screen within the venue.

2. The method of claim 1, wherein the virtual content is overlaid onto the video stream such that upon display of the video stream, the virtual content and one or more of the people within the venue appear to be interacting with one another as if the virtual content were real and present within the venue.

3. The method of claim 1, wherein the virtual content comprises a moving object, wherein analyzing the people within the video stream comprises detecting a given person to which the moving object is close and detecting motion of the given person, and wherein overlaying the virtual content onto the video stream comprises overlaying the moving object onto the video stream such that the moving object appears to bounce off or be hit by the given person as if the moving object were real and present within the venue.

4. The method of claim 1, wherein the virtual content comprises an object, wherein analyzing the people within the video stream comprises detecting a given person to which the object is close and detecting motion of the given person, and wherein overlaying the virtual content onto the video stream comprises overlaying the object onto the video stream such that the object appears to be caught by the given person as if the object were real and present within the venue.

5. The method of claim 1, wherein analyzing the people within the video stream and wherein overlaying the virtual content onto the video stream result in one or more of the people playing a game in relation to the virtual content.

6. The method of claim 1, wherein analyzing the people within the video stream and wherein overlaying the virtual content onto the video stream result in one or more of the people answering a question in relation to the virtual content.

7. The method of claim 1, wherein analyzing the people within the video stream comprises logically dividing the people into a plurality of groups and detecting motion of the people within each group, and wherein overlaying the virtual content onto the video stream comprises overlaying the virtual content based on the motions of the people within the groups.

8. The method of claim 1, wherein the virtual content comprises a character, wherein analyzing the people within the video stream comprises locating an empty seat within the venue, and wherein overlaying the virtual content onto the video stream comprises overlaying the character onto the empty seat such that the character appears to be sitting in the empty seat as if the character were real and present within the venue.

9. The method of claim 1, wherein analyzing the people within the video stream comprises selecting a given person within the venue, and wherein overlaying the virtual content onto the video stream comprises overlaying the virtual content to call attention to the given person.

10. A system comprising:
    a video camera to generate a video stream of a plurality of people within a venue;
    a processor; and,
    a computer-readable storage medium to store a computer program that is executed by the processor to analyze the people within the video stream, to overlay virtual content onto the video stream based on analysis of the people within the video stream, and to transmit the video stream with the virtual content overlaid thereon for display onto a screen within the venue.

11. The system of claim 10, further comprising one or more of:
    one or more light sources to illuminate the people within the venue; and,
    a projector to display the video stream, with the virtual content overlaid thereon, on a screen.

12. The system of claim 10, wherein the virtual content is overlaid onto the video stream such that upon display of the video stream, the virtual content and one or more of the people within the venue appear to be interacting with one another as if the virtual content were real and present within the venue.

13. The system of claim 10, wherein the virtual content comprises a moving object, wherein the computer program is to analyze the people within the video stream by detecting a given person to which the moving object is close and by detecting motion of the given person, and wherein the computer program is to overlay the virtual content onto the video stream by overlaying the moving object onto the video stream such that the moving object appears to bounce off or be hit by the given person as if the moving object were real and present within the venue.

14. The system of claim 10, wherein the virtual content comprises an object, wherein the computer program is to analyze the people within the video stream by detecting a given person to which the object is close and by detecting motion of the given person, and wherein the computer program is to overlay the virtual content onto the video stream by overlaying the object onto the video stream such that the object appears to be caught by the given person as if the object were real and present within the venue.

15. The system of claim 10, wherein the computer program is to analyze the people within the video stream and is to overlay the virtual content onto the video stream to result in one or more of the people playing a game in relation to the virtual content.

16. The system of claim 10, wherein the computer program is to analyze the people within the video stream and is to overlay the virtual content onto the video stream to result in one or more of the people answering a question in relation to the virtual content.

17. The system of claim 10, wherein the computer program is to analyze the people within the video stream by logically dividing the people into a plurality of groups and by detecting motion of the people within each group, and wherein the computer program is to overlay the virtual content onto the video stream by overlaying the virtual content based on the motions of the people within the groups.

18. The system of claim 10, wherein the virtual content comprises a character, wherein the computer program is to analyze the people within the video stream by locating an empty seat within the venue, and wherein the computer program is to overlay the virtual content onto the video stream by overlaying the character onto the empty seat such that the character appears to be sitting in the empty seat as if the character were real and present within the venue.

19. The system of claim 10, wherein the computer program is to analyze the people within the video stream by selecting a given person within the venue, and wherein the computer program is to overlay the virtual content onto the video stream by overlaying the virtual content to call attention to the given person.

20. A non-transitory computer-readable storage medium having a computer program stored thereon, wherein execution of the computer program by a processor of a computing device causes a method to be performed, the method comprising:
receiving a video stream of a plurality of people within a venue;
analyzing the people within the video stream;
overlaying virtual content onto the video stream based on analysis of the people within the video stream; and,
causing the video stream, with the virtual content overlaid thereon, to be displayed onto a screen within the venue.

21. The non-transitory computer-readable storage medium of claim 20, wherein the virtual content is overlaid onto the video stream such that upon display of the video stream, the virtual content and one or more of the people within the venue appear to be interacting with one another as if the virtual content were real and present within the venue.

22. The non-transitory computer-readable storage medium of claim 20, wherein the virtual content comprises a moving object, wherein analyzing the people within the video stream comprises detecting a given person to which the moving object is close and detecting motion of the given person, and wherein overlaying the virtual content onto the video stream comprises overlaying the moving object onto the video stream such that the moving object appears to bounce off or be hit by the given person as if the moving object were real and present within the venue.

23. The non-transitory computer-readable storage medium of claim 20, wherein the virtual content comprises an object, wherein analyzing the people within the video stream comprises detecting a given person to which the object is close and detecting motion of the given person, and wherein overlaying the virtual content onto the video stream comprises overlaying the object onto the video stream such that the object appears to be caught by the given person as if the object were real and present within the venue.

24. The non-transitory computer-readable storage medium of claim 20, wherein analyzing the people within the video stream and wherein overlaying the virtual content onto the video stream result in one or more of the people playing a game in relation to the virtual content.

25. The non-transitory computer-readable storage medium of claim 20, wherein analyzing the people within the video stream and wherein overlaying the virtual content onto the video stream result in one or more of the people answering a question in relation to the virtual content.

26. The non-transitory computer-readable storage medium of claim 20, wherein analyzing the people within the video stream comprises logically dividing the people into a plurality of groups and detecting motion of the people within each group, and wherein overlaying the virtual content onto the video stream comprises overlaying the virtual content based on the motions of the people within the groups.

27. The non-transitory computer-readable storage medium of claim 20, wherein the virtual content comprises a character, wherein analyzing the people within the video stream comprises locating an empty seat within the venue, and wherein overlaying the virtual content onto the video stream comprises overlaying the character onto the empty seat such that the character appears to be sitting in the empty seat as if the character were real and present within the venue.

28. The non-transitory computer-readable storage medium of claim 20, wherein analyzing the people within the video stream comprises selecting a given person within the venue, and wherein overlaying the virtual content onto the video stream comprises overlaying the virtual content to call attention to the given person.

* * * * *